US008977780B2

(12) United States Patent
Toillon et al.

(10) Patent No.: US 8,977,780 B2
(45) Date of Patent: Mar. 10, 2015

(54) DISTRIBUTED NODE NETWORK ADAPTED TO TOLERATE A GIVEN NUMBER OF NETWORK NODE BREAKDOWNS

(75) Inventors: Patrice Toillon, Neuilly sur Seine (FR); Tarik Aegerter, Neuilly sur Seine (FR)

(73) Assignee: Thales, Neuilly sur Seine (FR)

( * ) Notice: Subject to any disclaimer, the term of this patent is extended or adjusted under 35 U.S.C. 154(b) by 591 days.

(21) Appl. No.: 13/190,991

(22) Filed: Jul. 26, 2011

(65) Prior Publication Data

US 2012/0023264 A1   Jan. 26, 2012

(30) Foreign Application Priority Data

Jul. 26, 2010   (FR) ...................................... 10 03124

(51) Int. Cl.
*G06F 15/16*   (2006.01)
*H04L 12/437*   (2006.01)

(52) U.S. Cl.
CPC .................................... *H04L 12/437* (2013.01)
USPC ....................................................... 709/251

(58) Field of Classification Search
CPC ....... H04L 12/437; H04L 45/22; H04L 12/42; H04L 12/433; H04L 45/02; H04L 41/0654; H04L 12/44; H04L 41/12; H04L 12/422; H04J 14/0283; H04J 2203/006
USPC ........................................................ 709/251
See application file for complete search history.

(56) References Cited

U.S. PATENT DOCUMENTS

| | | | |
|---|---|---|---|
| 2003/0147345 A1* | 8/2003 | Takagi et al. | 370/222 |
| 2006/0230310 A1* | 10/2006 | Nobakht et al. | 714/12 |
| 2008/0080551 A1* | 4/2008 | Driscoll et al. | 370/465 |
| 2009/0116502 A1* | 5/2009 | Hall et al. | 370/406 |

FOREIGN PATENT DOCUMENTS

| | | |
|---|---|---|
| DE | 196 33 744 A1 | 2/1998 |
| EP | 1 906 599 A2 | 4/2008 |

OTHER PUBLICATIONS

Hall, et al., "Ringing Out Fault Tolerance. A New Ring Network for Superior Low-Cost Dependability", Dependable Systems and Networks, 2005. DSN 2005. Proceedings. International Conference on Yokohama, Japan Jun. 28, 2005, pp. 298-307.
Binns, et al., "Local Area Network Developments in the UK", Data Processing, IPC Press Ltd. London, GB, vol. 25, No. 4, May 1, 1983, pp. 23-25.
Search Report and Written Opinion for French Application No. FR1003124, dated Mar. 30, 2011.

* cited by examiner

*Primary Examiner* — Glenton B Burgess
*Assistant Examiner* — Imran Moorad
(74) *Attorney, Agent, or Firm* — Knobbe Martens Olson & Bear LLP

(57) ABSTRACT

A network having a plurality of electronic equipments and a plurality of network nodes is disclosed. The nodes are connected and form a reference ring, according to which ring the nodes are ordered by successive ranks. Each node is connected by a direct receiving connection to an upstream node and via a direct transmission connection to a downstream node. The network is adapted to tolerate a number of network node breakdowns, n being greater than 1. Each node is connected by a direct receiving connection to all of the other nodes placed, in the reference ring, up to: 2 ranks downstream and 1 rank upstream or 1 rank downstream and 2 ranks upstream if n is 2; n−1 ranks downstream and n−1 ranks upstream, if n is odd; or n−1 ranks downstream and n−2 ranks upstream, or n−2 ranks downstream and n−1 ranks upstream, if n is even and greater than 2.

13 Claims, 8 Drawing Sheets

DISTRIBUTED NODE NETWORK ADAPTED TO TOLERATE A GIVEN NUMBER OF NETWORK NODE BREAKDOWNS

CROSS-REFERENCE TO RELATED APPLICATIONS

This application claims the benefit of French Application No. 10 03124 filed Jul. 26, 2010, which is hereby expressly incorporated by reference in its entirety.

BACKGROUND

1. Field of the Invention

The present invention relates to a network, of the type comprising a plurality of pieces of electronic equipment subscribing to the network and a plurality of network nodes, each subscribing piece of equipment being directly connected to a network node, the network nodes being connected to each other via annular direct connections so as to form a reference ring, according to which ring the network nodes are ordered by successive ranks, a node with rank R relative to a reference network node being connected to said reference network node via R successive annular direct connections, each network node being connected by an annular direct receiving connection to an upstream node and via an annular direct transmission connection to a downstream node.

2. Description of the Related Technology

Such a network is intended to interconnect pieces of electronic equipment to allow them to exchange data.

Relative to a network having a central network node, to which all of the subscribing equipment is connected, such a network is more upgradable, less expensive and less bulky, which makes it particularly suited to avionic networks.

However, the current distributed networks are not fully satisfactory due to their limited availability. In fact, in the event of a breakdown of one of the network nodes, a piece of equipment subscribing to the network can no longer transfer data to the connected subscribing equipment, relative to the transmitting equipment, downstream of the broken node.

Document US 2006/0230310 describes a network of the aforementioned type, adapted to tolerate the breakdown of a network node. The network described in US 2006/0230310 thus has direct connections between network nodes that are not successively connected in the reference ring.

However, this solution is not fully satisfactory. Indeed, for operating safety reasons, it is desirable for the network of an aircraft to tolerate the breakdown of at least two network nodes.

SUMMARY OF CERTAIN INVENTIVE ASPECTS

One aim is therefore to provide a network having an upgradable architecture, the network being inexpensive and adapted to tolerate the breakdown of at least two network nodes.

To that end, in one aspect the invention relates to a network of the aforementioned type, adapted to tolerate a number of network node breakdowns, n being strictly greater than 1, each network node being connected by a direct receiving connection to all of the other network nodes placed, in the reference ring, up to:
  2 ranks downstream and 1 rank upstream or 1 rank downstream and 2 ranks upstream if n is equal to 2; or
  n−1 ranks downstream and n−1 ranks upstream, if n is odd; or
  n−1 ranks downstream and n−2 ranks upstream, or n−2 ranks downstream and n−1 ranks upstream, if n is even and strictly greater than 2.

The network can also comprise one or more of the following features, considered alone or according to all technically possible combinations:
  the network comprises as many network nodes as there are subscribing pieces of equipment, each network node being directly connected to a single piece of subscribing equipment;
  each network node comprises a network switch including a plurality of external ports connected to other network nodes and at least one internal port connected to the at least one subscribing piece of equipment directly connected to the network node;
  each network switch is adapted to duplicate and redirect each frame coming from one of the internal ports towards each of the external ports;
  each network switch includes:
    at least 4 external ports if n is equal to 2;
    at least 2n−1 external ports if n is odd;
    at least 2n−2 external ports if n is even and strictly greater than 2;
  such that each network switch has at least one external input and/or output port available to connect an outside piece of equipment to the network;
  the network comprises as many network nodes as there are subscribing pieces of equipment, each network node being directly connected to a single subscribing piece of equipment, and each network switch having at least:
    3 internal ports, if n is equal to 2;
    2n−2 internal ports, if n is odd;
    2n−3 internal ports, if n is even and strictly greater than 2.
  each network node has at least one network controller forming the interface between the network switch and at least one subscribing piece of equipment directly connected to the network node, the network controller being adapted to block the transmission of redundant frames towards the or each subscribing piece of equipment with which the network controller interfaces;
  the network switch and the or each network controller of a same network node are integrated within a single electronic component, this component being identical for all of the network nodes;
  each component housing a network switch and at least one network controller is part of a network structure to which the subscribing equipment is connected;
  each network controller has at least one first communication port for communicating with at least one subscribing piece of equipment, a second port connected to the network switch and a third service port for connecting a service system adapted to manage the supply of each network controller;
  the number n of tolerated equipment breakdowns being equal to 2, the network switch of each network node is adapted to route frames as follows:
    each frame coming from a first external port is redirected towards a fourth external port and/or towards a subscribing piece of equipment directly connected to the network node;
    each frame coming from a third external port is redirected towards the first external port and/or towards a second external port and/or towards a subscribing piece of equipment directly connected to the network node;
    each frame coming from a fourth external port is redirected towards the second external port and/or towards a subscribing piece of equipment directly connected to the network node; and each frame coming from a subscribing piece of equipment is duplicated and redirected towards each of the external ports;

each frame coming from the second external port is redirected towards all of the other external and/or internal ports;

the network is an aircraft network, the subscribing equipment being avionics modules; and the network is adapted to route frames from a transmitting subscribing piece of electronic equipment towards a receiving subscribing piece of electronic equipment, each frame transmitted by a subscribing piece of electronic equipment having a frame number comprising a first sequence encoding the functional content of the frame and a second sequence encoding the transmission order of the frame to allow the unique identification of each frame.

BRIEF DESCRIPTION OF THE DRAWINGS

Other features and advantages of the embodiments will appear more clearly upon reading the following description, provided solely as an example and done in reference to the appended drawings, in which.

DETAILED DESCRIPTION OF CERTAIN INVENTIVE EMBODIMENTS

Figure 1:
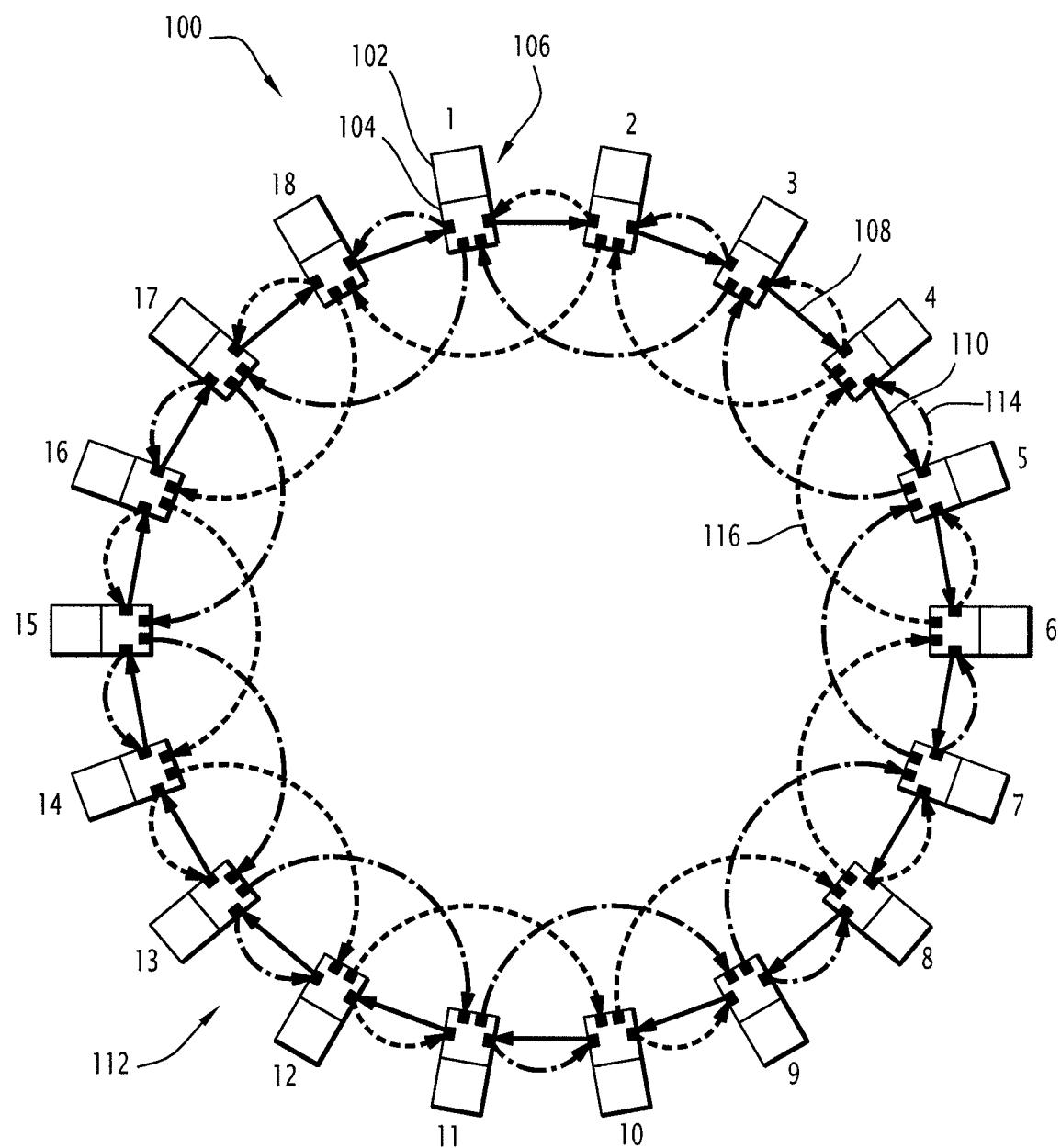
FIG. 1 is a diagrammatic view of a first network according to the invention.

The network 100 shown in FIG. 1 has a plurality of subscribing pieces of equipment 102 and network nodes 104. In the illustrated example, the network 100 has as many network nodes 104 as there are subscribing pieces of equipment 102.

The network 100 is for example an aircraft network, the subscribing equipment 102 being avionics modules.

In the illustrated example, each subscribing piece of equipment 102 is connected directly to a single network node 104, and each network node 104 is directly connected to a single subscribing piece of equipment 102. Each subscribing piece of equipment 102 forms, with the network node 104 to which it is connected, a subscribing group 106. Hereinafter, each subscribing group 106 will be designated by a unique subscriber number for example between 1 and 18. This subscriber number will also be used to designate the subscribing equipment 102 and the network node 104 that are part of the subscribing group 106.

The network nodes 104 are connected to each other by annular direct connections 108, 110, i.e. without interposition of another network node 104, so as to form a reference ring 112. In the illustrated example, two network nodes 104 connected by an annular direct connection 108, 110 are designated by successive subscriber numbers, the last node number 18 being connected to the first node number 1.

The network nodes 104 are ordered along the reference ring 112 by successive ranks. A node 104 with rank R relative to a reference network node 104 is connected to said reference network node 104 via R successive direct annular connections 108, 110.

For example, relative to network node number 4, network nodes number 3 and 5, which are each connected by a single direct annular connection, respectively 108 and 110, to network node number 4, constitute network nodes with rank 1 and network nodes number 2 and 6, which are each connected by two successive direct annular connections 108, 110 to network node number 4, form network nodes with rank 2.

Each direct annular connection 108, 110 is single-directional and is only adapted to convey data in one direction, from an upstream transmitting point towards a downstream receiving point. Each annular connection 108, 110 forms, depending on the considered network node 104, a direct annular receiving connection or a direct annular transmission connection. For example, for network node number 4, the annular connection 108, connecting network node number 4 to network node number 3, constitutes a direct annular receiving connection, while the annular connection 110, connecting network node number 4 to network node number 5, constitutes a direct annular transmitting connection.

Each network node 104 is thus connected by a direct annular receiving connection to an upstream node with rank 1 and by a direct annular transmitting connection to a downstream node with rank 1. For network node number 4, network node number 3 thus constitutes an upstream node with rank 1, and network node number 5 constitutes a downstream node with rank 1.

Network node number 2 constitutes an upstream node with rank 1 for network node number 3, while itself is an upstream network node with rank 1 for network node number 4. Network node number 2 therefore constitutes an upstream network node with rank 2 of network node number 4 in the reference ring 112.

Likewise, network node number 6 constitutes a downstream network node with rank 2 of network node number 4.

It is thus possible to distinguish, for each network node 104, the upstream and downstream network nodes with rank 1, rank 2, rank 3, etc.

The network 100 is adapted to tolerate breakdowns in at least two network nodes 104.

To that end, each network node 104 is connected by a direct receiving connection 108, 114, 116 to each other network node 104 placed, in the reference ring 112, up to two downstream ranks and one upstream rank. Network node number 4 is thus connected by the direct receiving connection 108 to its upstream network node with rank 1, i.e. network node number 3 (this direct receiving connection is also the direct annular receiving connection 108 of the reference ring), by the direct receiving connection 114 to its downstream network node with rank 1, i.e. network node number 5, and by direct receiving connection 116 to its downstream network node with rank 2, i.e. network node number 6.

Alternatively, each network node 104 is connected by a direct receiving connection to each other network node placed, in the reference ring 112, up to two upstream ranks and one downstream rank.

Figure 2:
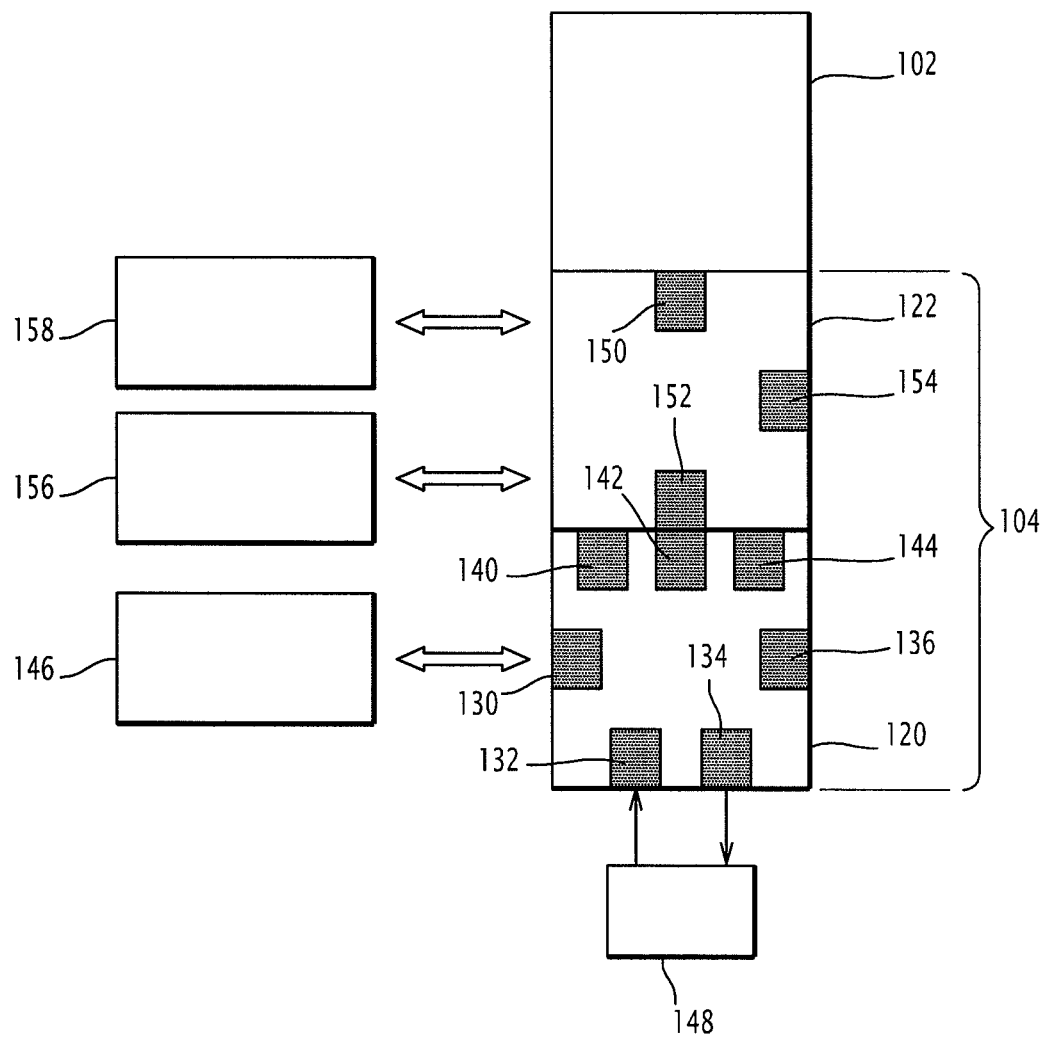
FIG. 2 is a diagrammatic illustration of a subscribing group of the network of FIG. 1.

A subscriber group 106 is presented in more detail in FIG. 2. The network node 104 comprises a network switch 120 and a network controller 122 serving as the interface between the network switch 120 and the subscriber equipment 102.

The network switch 120 has four external ports 130, 132, 134, 136, each being connected to another network node 104, and three internal ports 140, 142, 144 connected to the subscribing equipment 102 via the network controller 122. It is adapted to ensure the routing of a frame received at any one of its ports towards the other ports, as a function of a frame number contained in the frame and according to routing instructions stored in a configurable table 146 in memory in the network switch 120.

The four external ports 130, 132, 134, 136 comprise a first external port 130, connected by a direct two-way connection to the upstream network node with rank 1, a second external port 132, connected by an upstream direct one-way transmitting network node with rank 2, a third external port 134, connected by a direct one-way receiving connection to the downstream network node with rank 2, and a fourth external port 136, connected by a direct two-way connected to the downstream network node with rank 1.

The second and third external ports 132, 134 are thus available for connecting external equipment 148 to the network 100, i.e. a piece of electronic equipment that is not connected to one of the internal ports 140, 142, 144 of a network switch 120. The second external port 132 constitutes an external input port and is adapted to be connected via a receiving connection to a piece of external equipment 148. The third external port 134 constitutes an external output port and is adapted to be connected by a transmission connection to a piece of outside equipment 148.

The network controller 122 has a first communication port 150 for communicating with the subscribing equipment 102, a second port 152 connected to the internal ports 140, 142, 144 of the network switch 120 and a third service port 154, for connecting a service system (not shown) adapted for example to manage the electrical power supply for each network controller 122.

The network controller 122 also has a message exchange zone 156 for temporarily storing frames passing through the network controller 122, as well as a database 158 for storing frame numbers of the frames entering through the second port 152 and intended for the subscribing equipment 102.

The database 158 is adapted to store a given number of frame numbers, depending on the number of messages exchanged by the network 100.

The network controller 122 is adapted to block the transmission of redundant frames towards the subscribing equipment. Redundant frames are frames emitted by a same transmitter, at a same moment and containing a same functional content, resulting from a same original frame that has been duplicated by a network node 104. This point will be detailed later.

Figure 3:
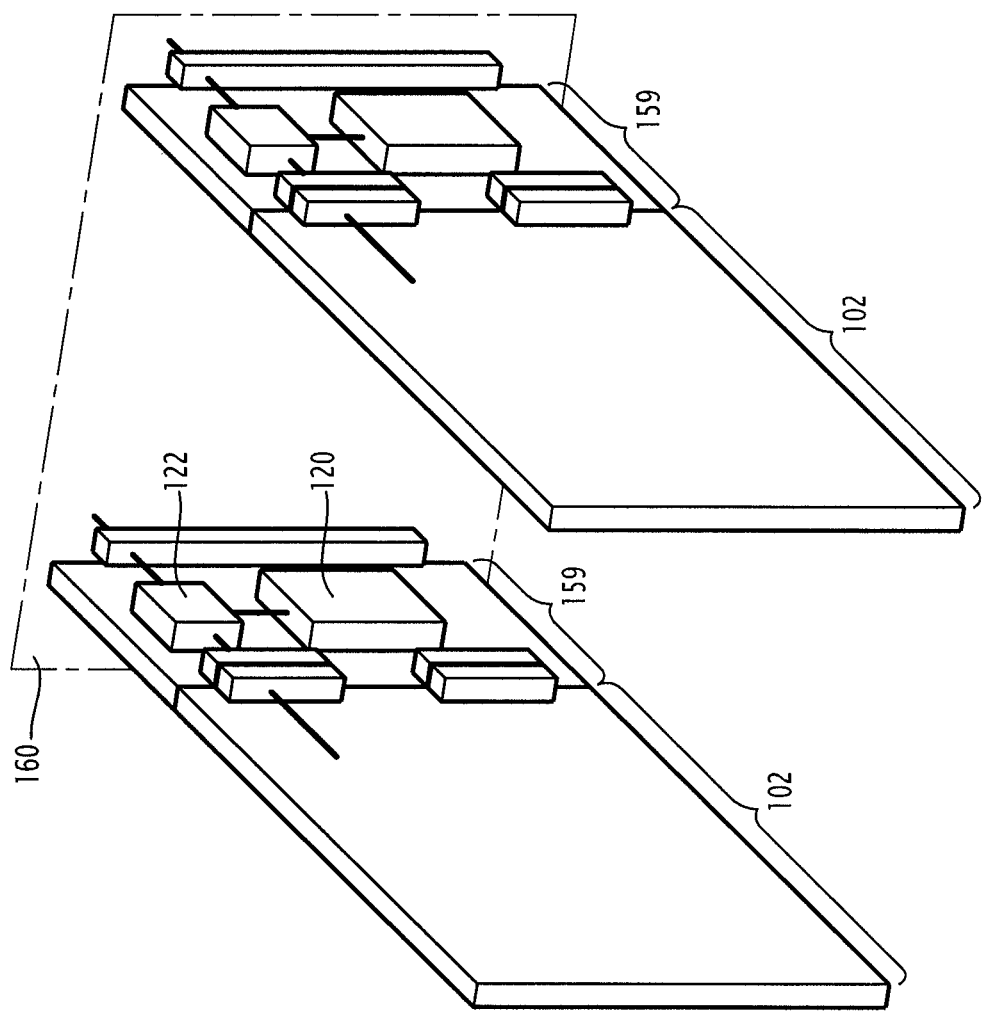
FIG. 3 is a diagrammatic view showing part of a network structure housing the network of FIG. 1.

Preferably, and as shown in FIG. 3, the network switch 120 and the network controller 122 are incorporated within a same electronic component 159, this component itself being part of a network structure 160 to which the subscribing equipment 102 is connected.

Figure 4:
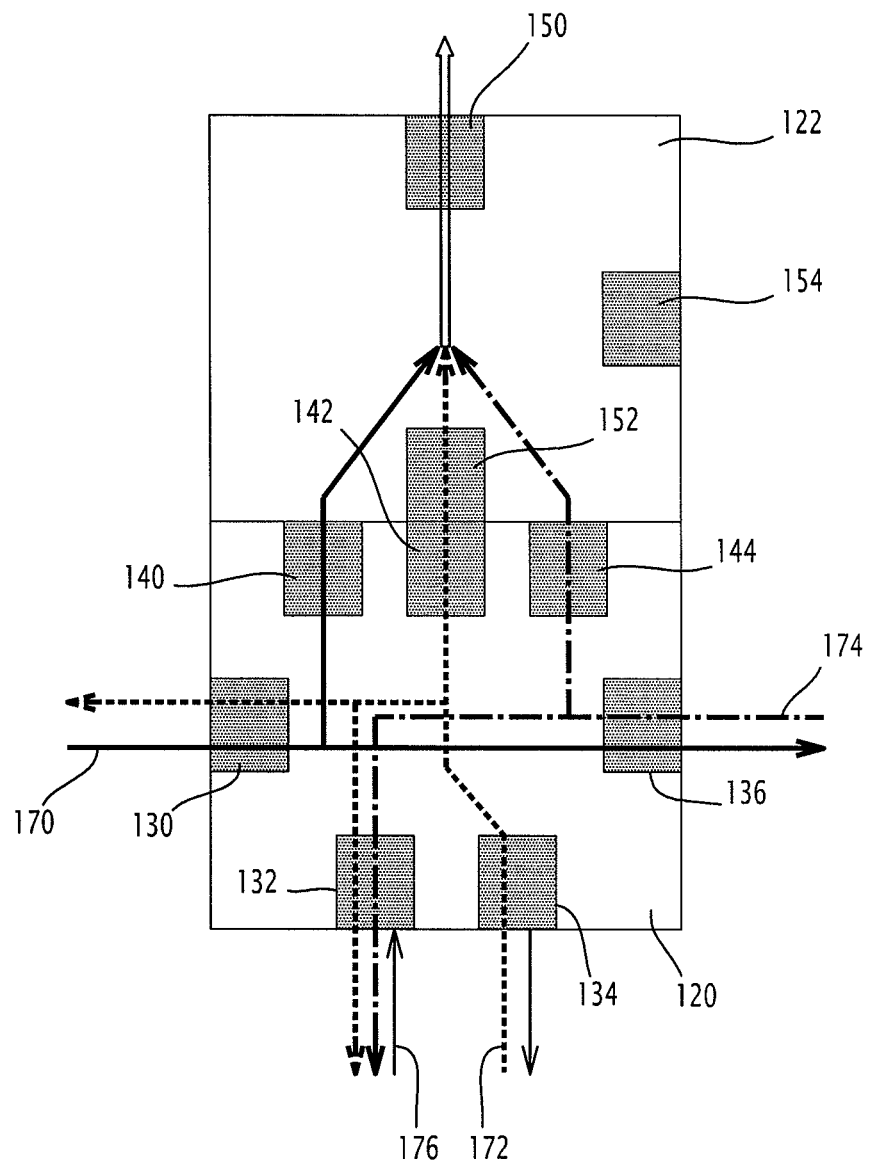
FIG. 4 is a diagrammatic view showing the circulation, at a network node of the subscribing group of FIG. 2, of frames coming from other subscribing groups of the network.
Figure 5:
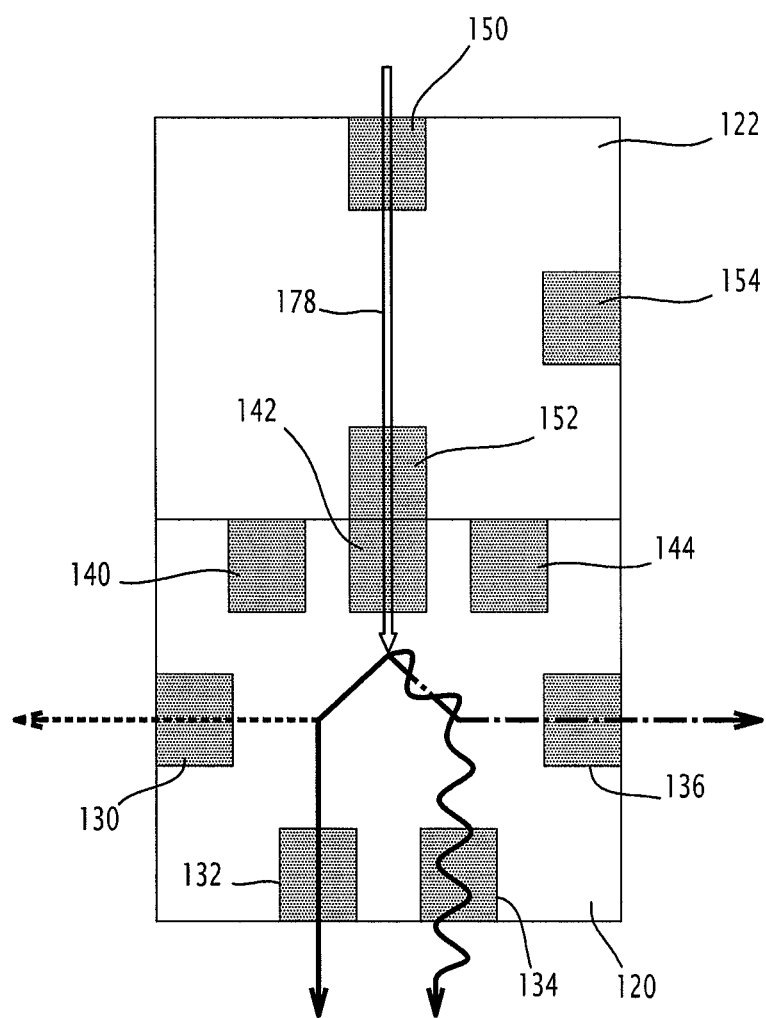
FIG. 5 is a view similar to that of FIG. 4, showing the circulation of frames transmitted from a subscribing piece of equipment directly connected to the network node.

FIGS. 4 and 5 diagram the routing of the frames by the network switch 120.

The network switch 120 is adapted to redirect a frame 170 entering through the first external port 130 (and therefore coming from the upstream network node with rank 1):

towards the fourth external port 136 (and therefore towards the downstream network node with rank 1) if a recipient of the frame 170 is not the subscribing equipment 102 directly connected to the network switch 120; and/or towards the first internal port 140 (and therefore towards the subscribing equipment 102) if a recipient of the frame 170 is the subscribing equipment 102 connected directly to the network switch 120.

The network switch 120 is adapted to redirect a frame 172 entering through the third external port 134 (and therefore coming from the downstream network node with rank 2):

towards the first external port 130 (and therefore towards the upstream network node with rank 1) if a recipient of the frame 172 is the upstream subscribing equipment 102 with rank 1; and/or towards the second internal port 142 (and therefore towards the subscribing equipment 102) if a recipient of the frame 172 is the subscribing equipment 102 connected directly to the network switch 120; and/or towards the second external port 132 (and therefore towards the upstream network node with rank 2) if a recipient of the frame 172 is neither the upstream subscribing equipment 102 with rank 1 or the subscribing equipment 102 connected to the network switch 120.

Lastly, the network switch 120 is adapted to redirect a frame 174 entering through the fourth external port 136 (and therefore coming from the downstream network node with rank 1):

towards the second external port 132 (and therefore towards the upstream network node with rank 2) if a recipient of the frame 174 is not the subscribing equipment 102 connected to the network switch 120; or towards the third internal port 144 (and therefore towards the subscribing equipment 102) if the recipient of the frame 174 is the subscribing equipment 102 connected to the network switch 120.

Furthermore, the network switch 120 is adapted to modify the routing of the frames in the event an external piece of equipment 148 is connected to the second and third external ports 132, 134 of the network switch 120, such that any frame 170, 174 coming from one of the other external ports 130, 136 is redirected towards the third external port 134, i.e. towards the external equipment 148, and that any frame 176 entering through the second external port 132 and therefore coming from the external equipment 148 is redirected towards the other external ports 130, 136 and/or the internal ports 140, 142, 144.

Moreover, looking at FIG. 5, the network switch 120 is adapted to duplicate any frame 178 entering through an internal port 140, 142, 144 (and therefore coming from the subscribing equipment 102) in as many copies as the network switch 120 has external ports and to redirect each copy of said frame 178 towards one of the external ports 130, 132, 134, 136, such that the frame 178 is redirected towards each of the external ports 130, 132, 134, 136.

Figure 6:
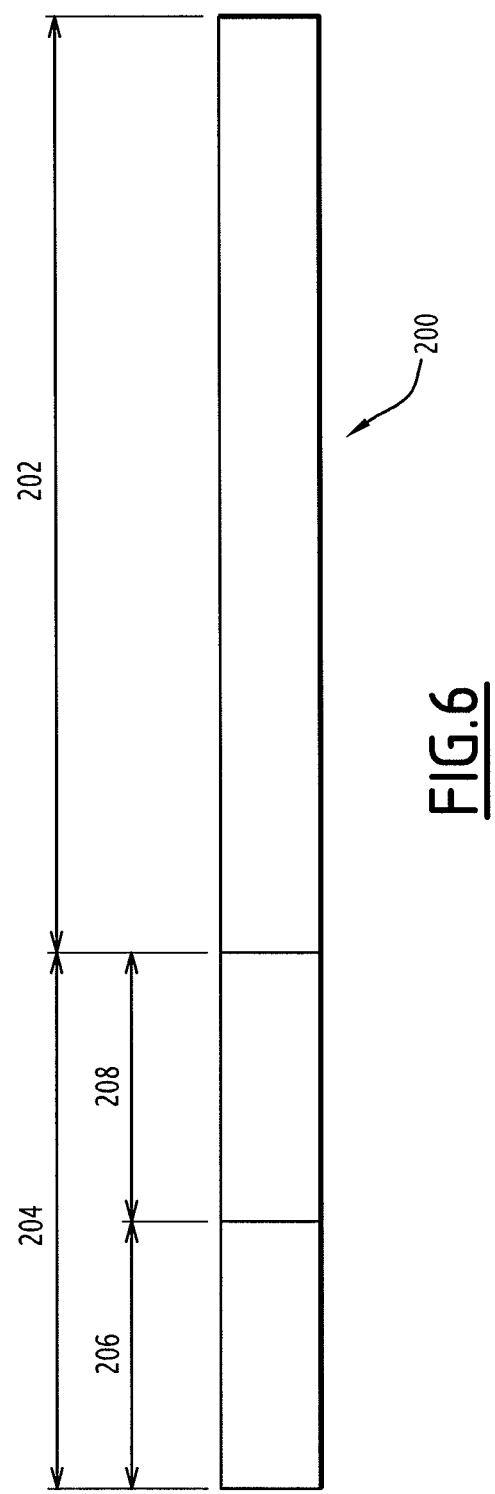
FIG. 6 is a view of the frame exchanged between the subscribing pieces of equipment of the network of FIG. 1.

As shown in FIG. 6, each frame 200 has a frame body 202 and a frame number 204.

The frame body 202 comprises the functional content of the frame, i.e. the information intended for the or each receiving piece of subscribing equipment 102. The frame number 204 is used to identify the frame 200 on the network, so as to ensure that it is routed towards the or each receiving piece of subscribing equipment 102.

Preferably, the frame number 204 is placed in the header, which allows faster reading by the equipment of the network 100, such as the network switches 120 and the network controllers 122.

Advantageously, the frame number 204 is encoded on 44 bits and is made up of two sequences: a first sequence 206 of N bits encoding the functional content of the frame 200 and a second sequence 208 of 44−N bits encoding the transmission order of the frame 200 through the transmitting subscribing equipment 102. For example, the second sequence 208 comprises a transmission number of the frame 200 or an imprint of the transmission moment of the frame 200.

During reception of the frame 200 by a network switch 120, the latter uses the first sequence 206 of the frame number 204 to redirect the frame 200. The configurable table 146 stores instructions specifying the or each port towards which the frame 200 must be redirected, as a function of the encoded information in the first sequence 206.

During receipt of the frame 200 by the network controller 122, the latter uses the entire frame number 204 to identify whether the frame 200 is a redundant frame. In fact, as mentioned above, all frames are duplicated 200 at the network switch 120 connected to the transmitting subscribing equipment 102, so that several copies of the same frame circulate on the network 100 and can arrive at the or each subscribing receiving piece of equipment 102. The fact that the frame number 204 is made up of two sequences 206 and 208 allows the unique identification of each frame 200 and any copies thereof The method for routing a frame 200 using the network 100 will now be described, in reference to FIGS. 4, 5 and 7.

Subscribing piece of equipment number 4 emits a frame 200 intended for subscribing piece of equipment number 18. This frame is duplicated in several copies 220, 221, 222 at network switch number 4 and is redirected towards all of the external ports of this network switch.

Figure 7:
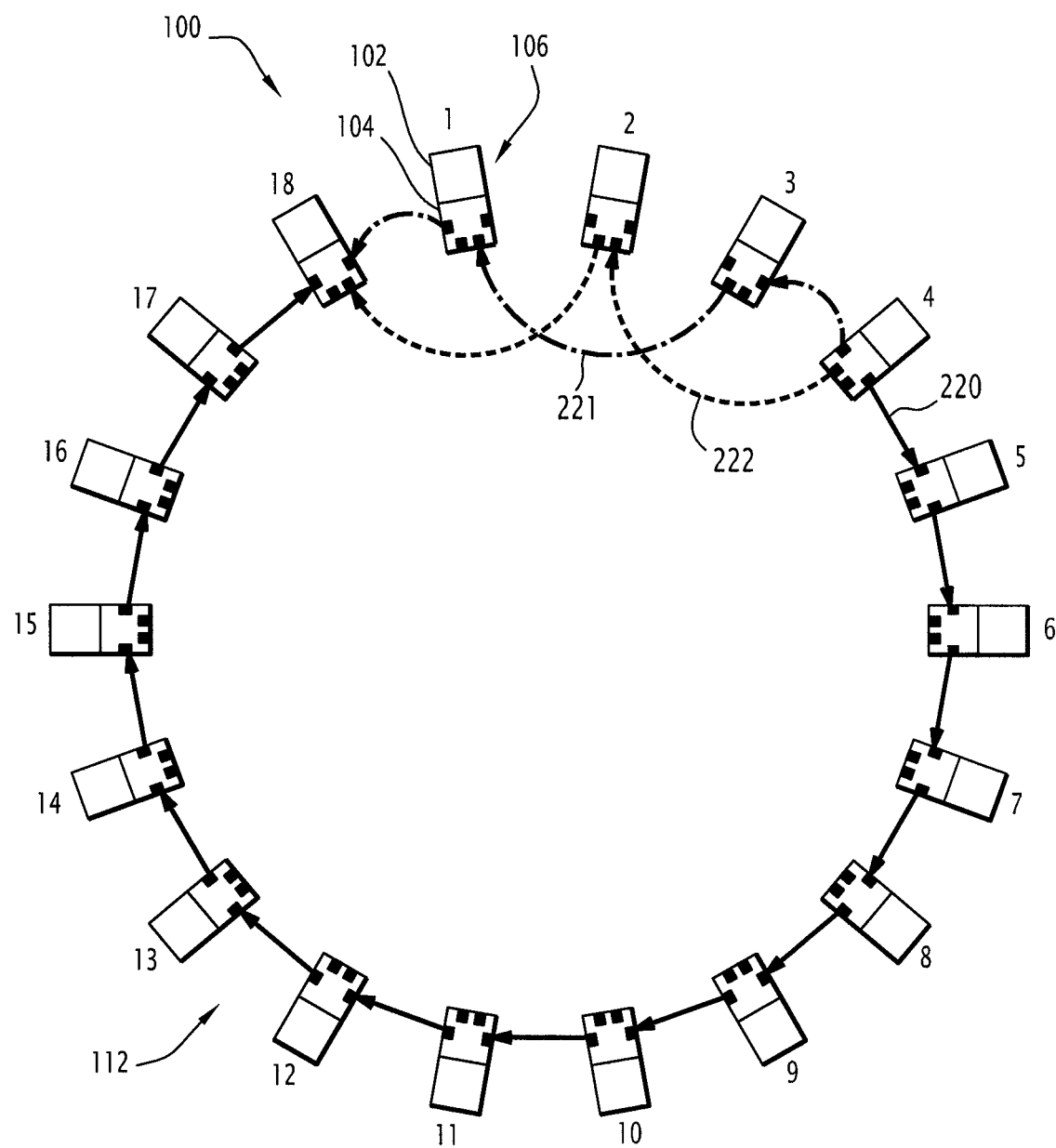
FIG. 7 is a view similar to that of FIG. 1, illustrating the paths of three copies of a same frame through the network.

FIG. 7 illustrates the paths of these copies 220, 221, 222 of the frame 200 through the network 100. For simplification reasons, FIG. 7 only shows the connections 108, 110, 114, 116 used by said copies of the frame 200.

Network switch number 5 receives a first copy 220 of the frame 200 at its first external port 130. It reads the first sequence 206 of the frame number 204 and views its configurable table 146. It reads there that the frame 200 is not intended for subscribing piece of equipment number 5 and that it must redirect the first copy 220 of the frame 200 towards its fourth external port 136, intended for network switch number 6.

This operation is reiterated turn by turn by each of the network switches numbered 6 to 17.

Network switch number 3 receives a second copy 221 of the frame 200 at its fourth external port 136. It reads the first sequence 206 of the frame number 204 and views its configurable table 146. It reads there that the frame 200 is not intended for subscribing equipment number 3 and it must redirect the second copy 221 of the frame 200 towards its second external port 132, intended for network switch number 1.

This second copy 221 of the frame 200 is then received by network switch number 1 at its third external port 134. It reads the first sequence 206 of the frame number 204 and views its configurable table 146. It reads there that the frame 200 is intended for subscribing equipment number 18 and that it must redirect the second copy 221 of the frame 200 towards its first external port 130, intended for network switch number 18.

Network switch number 2 receives a third copy 222 of the frame 220 at its third external port 134. It reads the first sequence 206 of the frame number 204 and views its configurable table 146. It reads there that the frame 200 is not intended for subscribing piece of equipment number 2, or for subscribing piece of equipment number 1, and that it must redirect the third copy 222 of the frame 200 towards its second external port 132, intended for network switch number 18.

Network switch number 18 receives the first copy 220 of the frame 200 at its first external port 130, the second copy 221 at its fourth external port 136 and the third copy 222 at its third external port 134. For each copy 220, 221, 222 of the frame 200, it reads the first sequence 206 of the frame number 204 and views its configurable table 146. It reads there that the frame 200 is intended for subscribing piece of equipment number 18 and then redirects each copy 220, 221, 222, respectively, of the frame 200 towards an internal port 140, 142, 144, respectively.

Network controller number 18 first receives the third copy 222 of the frame 200. It reads the first 206 and second 208 sequences of the frame number 204 and compares this frame number 204 to the frame numbers stored in the database 158. It sees that the frame number 204 is not present in the database 158. It then allows the third copy 222 of the frame 200 to pass towards subscribing piece of equipment number 18 and records the frame number 204 in the database 158.

Network controller number 18 then receives the first 220 and second 221 copies of the frame 200. For each of the first 220 and second 221 copies, it reads the first 206 and second 208 sequences of the frame number 204 and compares this frame number 204 to the frame numbers stored in the database 158, sees that the frame number 204 is already present in the database 158 and prevents the passage of the first 221, second 222, respectively, copy of the frame 200.

The operation of the network 100 is therefore transparent for subscribing piece of equipment number 18, which only receives one copy 222 of the frame 200.

Owing to the invention, the operating safety of the distributed networks is strengthened, which is particularly advantageous in the context of avionics networks, where the breakdown of the network during flight is critical.

Furthermore, the proposed architecture is upgradable, inexpensive, and offers great compatibility with current equipment.

Figure 8:
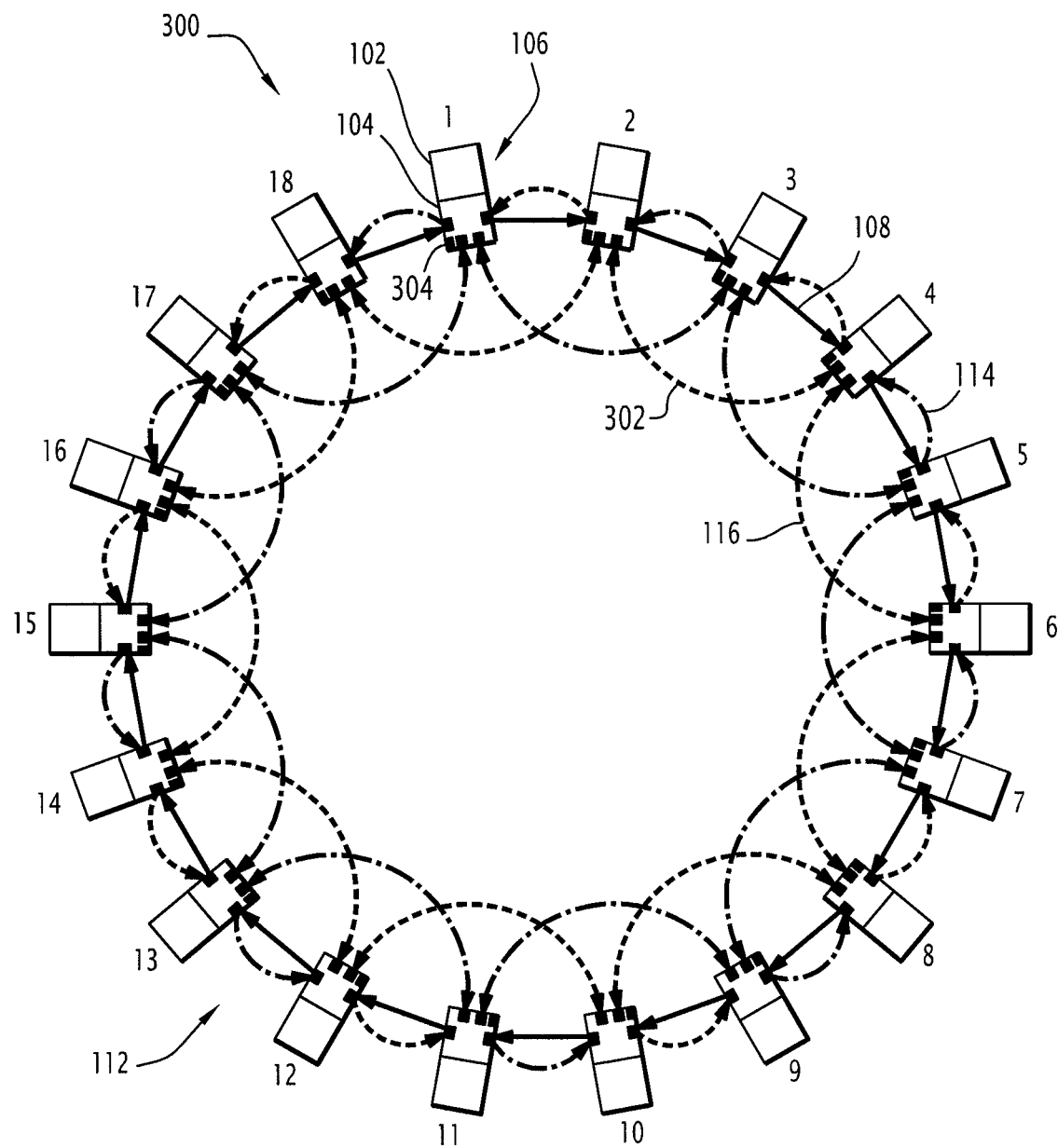
FIG. 8 is a diagrammatic view of a second network according to the invention.

A network 300, adapted to tolerate breakdowns in at least three network nodes 104, is shown in FIG. 8. The same references have been used to designate the elements shared by the networks 100 and 300.

As for the network 100, each network node 104 (e.g. node number 4) is connected by a direct receiving connection 108 to the upstream network node with rank 1 (node number 3), by a direct receiving connection 114 to the downstream network node with rank 1 (node number 5) and by a direct receiving connection 116 to the downstream network node with rank 1 (node number 5) and by a direct receiving connection 116 to the downstream network node with rank 2 (node number 6). Unlike the network 100, each network node 104 (for example node number 4) is also connected by a direct receiving connection 302 to the upstream network node with rank 2 (network node number 2).

Each network switch 120 comprises five external ports, so that at least one external output and/or input port remains available to connect an external piece of equipment 148 to the network.

For simplification reasons, the direct connections 116 and 302 have been shown in FIG. 8 as forming a single two-way connection. Furthermore, a fifth external port 304 of each network switch 120 has been shown as not being connected to any other network node 104, said fifth external port 302 constituting an external output and input port available for connecting an external piece of equipment 148 to the network. These illustrative choices are not, however, limiting.

These results can be extrapolated to networks adapted to tolerate breakdowns of a number n of network nodes, n being strictly greater than 2. Each network switch then comprises at least 2n−1 external ports and 2n−2 internal ports if n is odd or at least 2n−2 external ports and 2n−3 internal ports if n is even and each network node is connected by a direct receiving connection to all of the other network nodes placed, in the reference ring, up to:

n−1 downstream ranks and n−1 upstream ranks if n is odd and strictly greater than 1; or n−1 downstream ranks and n−2 upstream ranks or n−2 downstream ranks and n−1 upstream ranks is n is even.

It is also possible to consider adapting the network so that at least one subscribing group comprises a single network switch and a plurality of subscribing pieces of equipment, the subscribing pieces of equipment all being connected to the same single network switch. In a first alternative of this embodiment, the subscribing group comprises as many network controllers as there are subscribing pieces of equipment, each subscribing piece of equipment having its own network controller. In a second alternative, several subscribing pieces of equipment are connected to a same network controller, the network controller having several first ports, each subscribing piece of equipment being connected to a first specific port.

What is claimed is:

1. A network, of the type comprising:
   a plurality of pieces of electronic equipment subscribing to the network, and
   a plurality of network nodes, each subscribing piece of equipment being directly connected to a network node, the network nodes being connected to each other via annular direct connections so as to form a reference ring, according to which ring the network nodes are ordered by successive ranks, a node with rank R relative to a reference network node being connected to said reference network node via R successive annular direct connections, each network node being connected by an annular direct receiving connection to an upstream node and via an annular direct transmission connection to a downstream node, characterized in that the network is adapted to tolerate a number n of network node breakdowns, n being strictly greater than 1, each network node being connected by a direct receiving connection to all of the other network nodes placed, in the reference ring, up to:
   2 ranks downstream and 1 rank upstream or 1 rank downstream and 2 ranks upstream if n is equal to 2; or
   n−1 ranks downstream and n−1 ranks upstream, if n is odd and strictly greater than 1; or
   n−1 ranks downstream and n−2 ranks upstream, or n−2 ranks downstream and n−1 ranks upstream, if n is even and strictly greater than 2;
   wherein the network is adapted to route frames from a transmitting subscribing piece of electronic equipment towards a receiving subscribing piece of electronic equipment, each transmitted frame having a frame number comprising a first sequence encoding functional content of the frame and a second sequence encoding a transmission order of the frame to allow the unique identification of each frame.

2. The network according to claim 1, wherein the network comprises as many network nodes as there are subscribing pieces of equipment, each network node being directly connected to a single subscribing piece of equipment.

3. The network according to claim 1, wherein each network node comprises a network switch comprising a plurality of external ports connected to other network nodes and at least one internal port connected to the at least one subscribing piece of equipment directly connected to the network node.

4. The network according to claim 3, wherein each network switch is adapted to duplicate and redirect each frame coming from one of the internal ports towards each of the external ports.

5. The network according to claim 3, wherein each network switch comprises:
   at least 4 external ports if n is equal to 2;
   at least 2n−1 external ports if n is odd;
   at least 2n−2 external ports if n is even and strictly greater than 2;
   such that each network switch has at least one external input and/or output port available to connect an outside piece of equipment to the network.

6. The network according to claim 3, wherein the network comprises as many network nodes as there are subscribing pieces of equipment, each network node being directly connected to a single subscribing piece of equipment, and each network switch comprising at least:
   3 internal ports, if n is equal to 2;
   2n−2 internal ports, if n is odd;
   2n−3 internal ports, if n is even and strictly greater than 2.

7. The network according to claim 3, wherein each network node comprises at least one network controller forming an interface between the network switch and at least one subscribing piece of equipment directly connected to the network node, the network controller being adapted to block a transmission of redundant frames towards the or each subscribing piece of equipment with which the network controller interfaces.

8. The network according to claim 7, wherein the network switch and each network controller of a same network node are integrated within a single electronic component, this component being identical for all of the network nodes.

9. The network according to claim 8, wherein each component housing a network switch and at least one network controller is part of a network structure to which the subscribing piece of equipment is connected.

10. The network according to claim 7, wherein each network controller comprises at least one first communication port for communicating with at least one subscribing piece of equipment, a second port connected to the network switch and a third service port for connecting a service system adapted to manage the supply of each network controller.

11. The network according to claim 5, the number n of tolerated equipment breakdowns being equal to 2, the network switch of each network node is adapted to route frames as follows:
   each frame coming from a first external port is redirected towards a fourth external port and/or towards a subscribing piece of equipment directly connected to the network node;
   each frame coming from a third external port is redirected towards the first external port and/or towards a second external port and/or towards a subscribing piece of equipment directly connected to the network node;
   each frame coming from a fourth external port is redirected towards the second external port and/or towards a subscribing piece of equipment directly connected to the network node; and
   each frame coming from a subscribing piece of equipment is duplicated and redirected towards each of the external ports.

12. The network according to claim 11, wherein each frame coming from the second external port is redirected towards all of the other external and/or internal ports.

13. The network according to claim 1, wherein the network is an aircraft network, the subscribing equipment being avionics modules.

\* \* \* \* \*